June 30, 1953 R. A. EMMETT, JR 2,644,155
BLIND LANDING SYSTEM
Filed Nov. 21, 1945 4 Sheets-Sheet 1

Inventor
ROBERT A. EMMETT JR.

By M. Q. Hayes
Attorney

June 30, 1953  R. A. EMMETT, JR  2,644,155
BLIND LANDING SYSTEM
Filed Nov. 21, 1945  4 Sheets-Sheet 4

Inventor
ROBERT A. EMMETT JR.

By M. A. Hayes
Attorney

Patented June 30, 1953

2,644,155

UNITED STATES PATENT OFFICE 2,644,155

BLIND LANDING SYSTEM

Robert A. Emmett, Jr., United States Navy

Application November 21, 1945, Serial No. 630,115

5 Claims. (Cl. 343—11)

(Granted under Title 35, U. S. Code (1952), sec. 266)

The present invention relates in general to radio blind landing systems for aircraft and, more particularly, to a system for providing an indication to a landing aircraft of the position and heading of the aircraft with respect to radio beacons or radiation fields forming the guidance means for the landing operation.

Radio landing systems of the type generally employed comprise radiated fields established by transmitting means located on the ground adjacent the landing area and which define courses in space which are followed by the aircraft in landing. Such systems include a plurality of radio beacons positioned in spaced relation with the runway to be used in the landing operation to define the proper course path to align the aircraft with the axis of the runway, the vertical glide path and the distance to the runway. The aircraft must carry radio equipment responsive to these radiation fields to indicate to the pilot the proper course, glide path, heading of the aircraft with respect to the runway and thus wind drift, and range to the runway to enable him to complete a successful blind landing. The airborne equipment required to interpret these radiation fields and supply the necessary information to the pilot usually involves considerable additional space and weight in an aircraft already loaded to capacity with auxiliary apparatus.

Accordingly, it is an object of this invention to provide a novel blind landing system in which is generated a system of radiation fields to which conventional airborne echo ranging apparatus will be responsive to indicate course, glide path, wind drift and range to the runway.

Another object of the invention is to provide a novel blind landing system requiring only a conventional echo ranging unit usually carried by military aircraft as the airborne component of the system.

Another object of the invention is to provide a novel blind landing system in which radiation fields are generated to indicate in conventional airborne echo ranging equipment the position and heading of an aircraft with respect to the runway, localizer course and the path to ground established by the radiation fields.

Another object of the invention is to provide a novel blind landing system requiring no additional airborne equipment, but adapted to be employed with radio equipment conventionally carried by military aircraft.

Other objects, advantages and capabilities of the invention will become apparent from the following description, taken in conjunction with the accompanying drawings, in which only a preferred embodiment of the invention is shown:

The instant blind landing system comprises a ground installation consisting of a pair of radiating sectoral horns usually positioned at the upwind end of the runway to be used in the blind landing operation in such a relation that their radiation patterns overlap along the center line of the runway, a separate pulse transmitter for each sectoral horn, and a receiver responsive to the transmitted pulse of echo ranging apparatus that may be carried by the landing aircraft and adapted to actuate the two ground transmitters in timed relation so that the pulse output of one transmitter immediately follows in time that of the other transmitter. These pulse radiations are picked up by the receiver component of the echo ranging apparatus carried by the aircraft and applied to a cathode-ray tube in a conventional manner to appear on the screen of the cathode-ray tube as two separate pulses of slightly different range from the aircraft, the amplitude of each pulse being proportional to the field strength of the particular horn radiation pattern from which it was transmitted, the lateral position of the pulses on the screen being proportional to the heading of the aircraft with respect to the axis of the radiations and thus of the runway and the vertical position of the pulses on the screen being proportional to the range from the aircraft to the transmitting horns.

Figure 1:
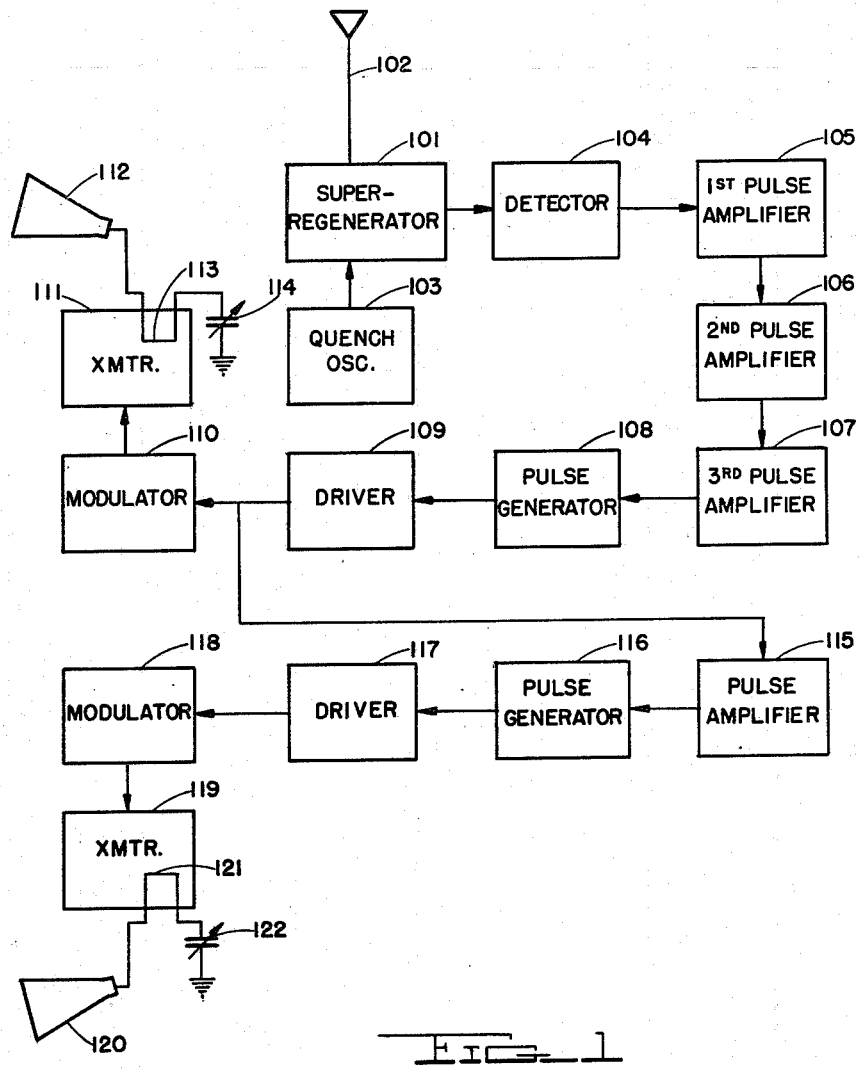
Figure 1 is a block diagram of the ground installation of the blind landing system.
Figure 2:
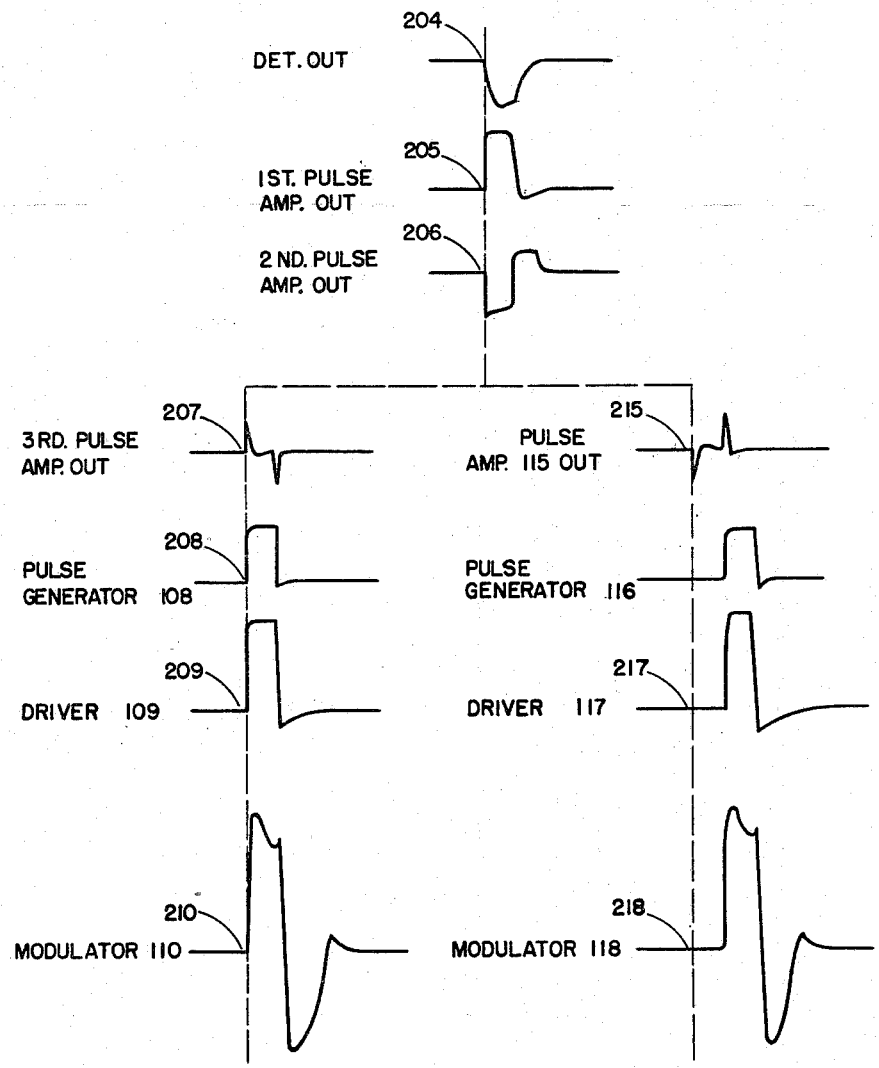
Figure 2 is a series of time-related wave forms taken from various indicated points on the ground installation of Fig. 1.

Referring now to Figures 1 and 2 of the drawings, in which are shown schematically the ground installation and the waveforms associated with its components, I have provided a receiver of the super-regenerative type comprising a super-regenerator 101 having a non-directional antenna 102 coupled into its grid circuit. Likewise coupled to the grid of the super-regenerator 101 is the output of a quench oscillator 103 to control the operation of the super-regenerator 101 in a conventional manner. The output of the super-regenerator 101 is fed to a detector 104 which rectifies this output and delivers a series of negative pulses 204 to the first pulse amplifier 105. Amplifier 105 merely amplifies and sharpens the pulses, and delivers them as a series of positive pulses 205 to a second pulse amplifier 106 having a short time constant input circuit for shaping the pulses. The output negative pulses 206 of this stage, consisting of a negative pulse followed by a short duration positive excursion, is fed to a third amplifier 107 having a short time constant output circuit which amplifies and sharpens the input pulses to produce a series of positive trigger pulses 207. The amplifier output 207 is delivered to a pulse generator 108 as triggering impulses. This pulse generator 108 is a multivibrator of the "one-shot" variety designed to generate a strong 10 microsecond positive pulse, such as in waveform 208, when triggered by the positive pulses 207. This 10 microsecond positive pulse 208 is fed to a driver stage 109 connected as a cathode follower to generate a pulse 209 of appreciable power content without distorting the waveform of the input signal. This pulse output 209 is coupled into a modulator 110 to generate a very high voltage pulse 210 with a sharp negative excursion to energize a transmitter oscillator 111 and cut off the oscillations sharply at the end of the modulator pulse 210. To radiate the oscillations generated by the transmitter 111 in a directional radiation pattern, a sectoral horn 112 is provided. The horn 112 is coupled to the transmitter by means of an inductive coupling member 113 and a variable series capacitor 114 between the inductor coupling 113 and ground, the capacitor 114 being designed to regulate the amplitude of oscillations coupled into the horn 112.

Likewise coupled to the output 209 of the driver 109 is a pulse amplifier 115 which is a substantial duplicate of the pulse amplifier 107, having a short time constant output circuit. This stage 115 inverts the driver pulses 209, giving a waveform 215 having sharp negative pulses coincident in time with the positive pulses in the output 207 of pulse amplifier 107, and positive pulses coincident with the negative pulses in the output 207. This waveform 215 is coupled to a pulse generator 116, also a "one-shot" multivibrator designed to generate a 10 microsecond positive pulse 216 when a positive trigger pulse is fed in. It is apparent that a positive output pulse will be generated in the multivibrator 116, the leading edge of which coincides with the trailing edge of the transmitted pulse generated in transmitter oscillator 111. This pulse output 216 of pulse generator 116 is delivered to driver stage 117 and thence to modulator 118, each a duplicate of driver 109 and modulator 110, respectively, in the previous transmission channel, to amplify the power and then the voltage level of the positive pulse 216, the driver 117 and modulator 118 outputs being related in time and shape with the waveforms 209 and 210 as indicated by waveforms 217 and 218. The output 218 of modulator 118 is fed to a transmitter oscillator 119 to generate an R. F. output pulse similar in duration and frequency to the output of transmitter oscillator 111, but occurring immediately after the termination of the pulse transmitted by transmitter 111. The output of transmitter 119 is coupled to a sectoral horn 120 through an inductive coupling member 121 and a variable series capacitor 122 between the member 121 and ground. The variable capacitors 114 and 122 are provided to enable the pulse amplitude coupled into the sectoral horns 112 and 120 and radiated thereby to be equalized.

The sectoral horns 112 and 120, in practice, are positioned a predetermined distance from one end of the runway with which the ground installation is to be employed, in line with the longitudinal axis of the runway, and orientated so that their radiation patterns overlap over the center line of the runway. It will be apparent that, when a radiated pulse of proper frequency is picked up by the receiver in the ground installation, a pulse will be initiated in the pulse generator 108 to energize the transmitter oscillator 111 and directionally radiate a pulse of predetermined frequency and duration through the horn 112, the trailing edge of the output pulse of pulse generator 108 also initiating a pulse of the same duration in the pulse generator 116 to energize the transmitter oscillator 119 and directionally radiate through the horn 120 a pulse of the same frequency as that generated by transmitter 111 but delayed in time with respect to the leading edge of the first mentioned pulse by an amount equal to the duration of that pulse.

Figure 3:
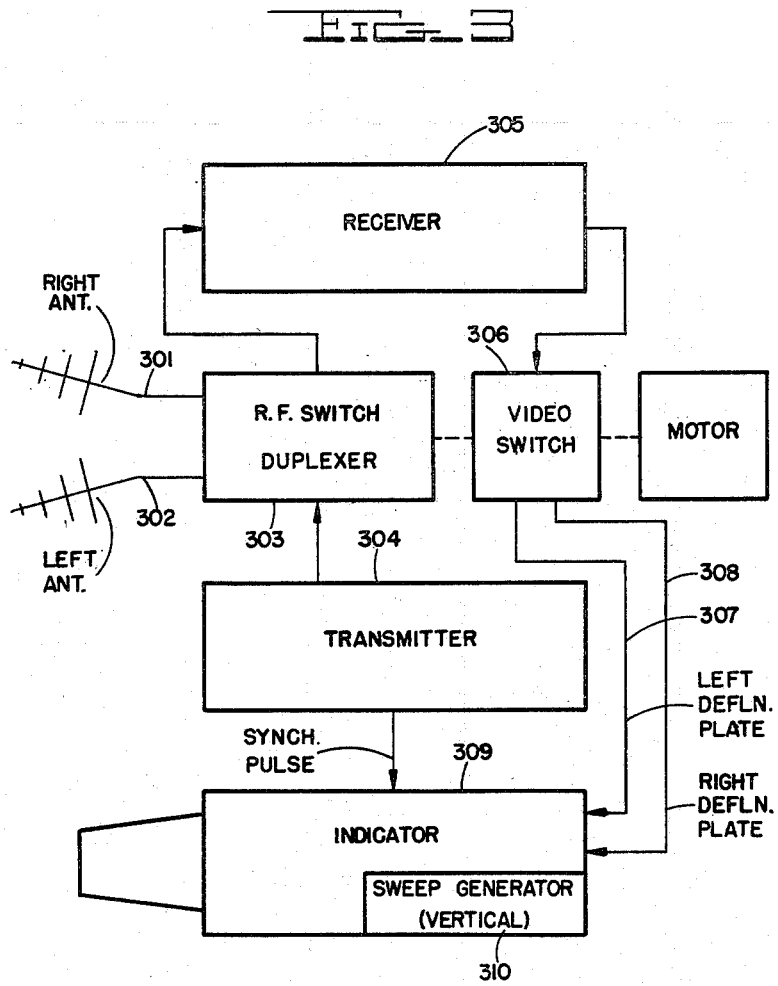
Figure 3 is a block diagram of a conventional airborne echo ranging unit with which the blind landing system is adapted to operate.

Referring now to Figure 3 showing a typical airborne echo ranging unit with which the above described ground installation is adapted to operate, a pair of directional Yagi antennas 301 and 302, one mounted on the right wing and one on the left wing of the aircraft, are selectively coupled through a radio frequency switch and duplexing unit 303 to an echo ranging unit transmitter 304 or receiver 305. The switching unit 303 successively couples antennas 301 and 302 into operative relation with the transmitter and receiver circuits. Thus, switching unit 303 initially connects one of the antennas, say for example right antenna 301, to the transmitter 304 and receiver 305. Next switch 303 removes the right antenna completely from the circuit and then connects left antenna 302 to transmitter 304 and to receiver 305. This successive switching of antennas 301 and 302, of course, is repeated. The video output of receiver 305 is fed to a video switch 306 mechanically coupled to the R. F. switch 303 to operate in synchronism therewith to couple the receiver video output first to one lead 307 when the right antenna 301 is coupled to the receiver 305 and to another lead 308 when the left antenna 302 is coupled to the receiver. The leads 307 and 308 couple the receiver output to the left and right deflection plates, respectively, of an electrostatic cathode-ray tube in the echo ranging unit indicator 309, assuming the video output of receiver 305 is in the form of negative pulses. The indicator 309 is provided with a sweep generator 310 triggered in synchronism with the transmitter 304 and coupled to the vertical deflection plates of the cathode-ray tube to produce a vertical range sweep or time base in the center of the screen of the tube. Thus a signal picked up by the right antenna 301 is indicated by a deflection of the vertical time base or sweep to the right of the center of the tube while a signal received through the left antenna 302 is indicated by a deflection to the left of the vertical center trace.

Figure 4:
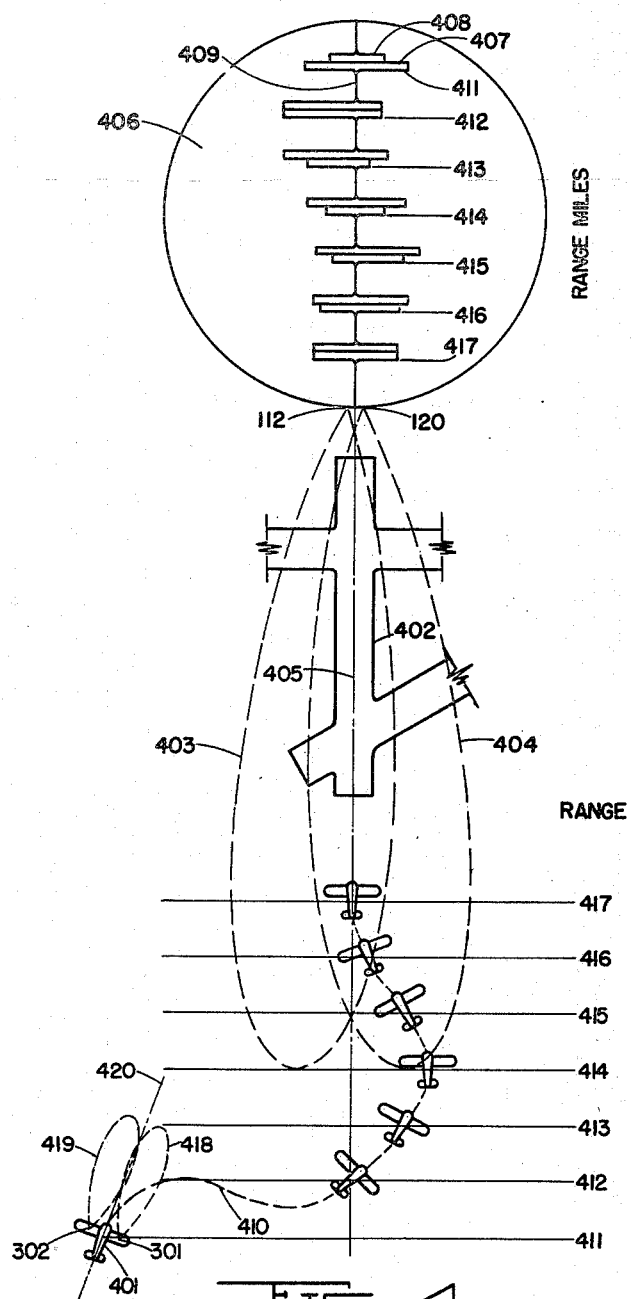
Figure 4 is a diagram of an exemplary approach path of an aircraft with the blind landing system and the indications that would be exhibited on the echo ranging indicator of Fig. 3.

Referring now to Figures 1, 3 and 4, the operation of the blind landing system is as follows. Assume an approaching aircraft 401 is to make a blind landing on runway 402 having the ground installation shown in Figure 1 in which the sectoral horns 112 and 120 are so positioned with respect to the runway 402 that their radiation patterns 403, 404 overlap along the center line 405 of the runway. The pulsed radiations 403 precede in time the pulsed radiations 404 by an amount equal to the duration of the pulse, and appear on the echo ranging unit indicator screen 406 as pulses 407, 408, respectively, formed by the lateral deflection of the vertical sweep 409. The comparative amplitudes of these two pulses 407, 408 are dependent upon the position of the aircraft with respect to the equi-signal line 405 of the two radiation fields 403, 404. The distance of the aircraft from the runway 402 or the transmission horns 112, 120 is indicated by the distance along the vertical sweep 409 from the pulses 407, 408 to the origin of the sweep at the bottom of the screen 406 since the time required for the airborne echo ranging unit to trigger the ground installation and receive the course defining radiation pulses is a function of the distance between the aircraft and the runway. Thus as the aircraft nears the runway 402 along the approach path 410, the pair of pulses 407, 408 moves nearer the origin of the sweep 409. In practice, the screen 406 is calibrated in range so that the distance from the aircraft to the transmitter horns can be read off directly. Thus, from the vertical position of the pulses and their comparative amplitudes, the operator of the echo ranging unit can determine the distance and bearing of the aircraft from the runway. The successive positions and amplitudes of the pulses 407, 408 for different positions of the aircraft 401 along the approach path 410 are indicated in Fig. 4 by the reference characters 411 through 417.

The aircraft carries right and left Yagi antennas 301 and 302 for the echo ranging unit, the antennas having receiving patterns indicated at 418 and 419 overlapping along the longitudinal axis 420 of the aircraft. Since, by means of the switching units 303 and 306 the radiated pulses picked up by the right antenna 301 deflect the vertical sweep 409 to the right of the screen 406 and the pulses picked up by the left antenna 302 deflect the sweep to the left of screen 406, the orientation of the aircraft with respect to the line of bearing of the aircraft from the transmitter horns is indicated by the amplitudes of the right and left halves of the pulses with respect to the center of the screen 406. Thus, if the aircraft 401 is oriented so that the left antenna 302 picks up a greater amount of the radiated pulse than the right antenna 301, as in position 412, the pulses 407, 408 will appear to be centered to the left of the sweep 409 on screen 406. This will enable the pilot, when the aircraft is maintained "on course" with the comparative amplitudes of the two pulses equal, to determine the wind drift by noting the position of the apparent center of the pulses i. e. the heading he must maintain to keep the aircraft "on course."

It will be apparent from the foregoing description that a blind landing system is provided in which the ground installation generating the radiation fields defining the landing course and other necessary information is actuated automatically by echo ranging apparatus usually carried on aircraft to set up the radiation fields at the proper frequencies and of proper characteristics to indicate in the echo ranging apparatus the position and bearing of the runway and the wind drift existing at that time.

Various modifications may be made in the invention without departing from the spirit and scope thereof.

The invention described herein may be manufactured and used by or for the Government of the United States of America for governmental purposes without the payment of any royalties thereon or therefor.

What is claimed is:

1. In a radio landing system for use in determining the relative position of an aircraft with respect to a runway, the combination of a first means located in said aircraft for generating pulses of energy in space, a single omnidirectional receiving means operative to receive the generated pulses of energy, a pair of directional radiating means fixedly positioned adjacent to the runway and having substantially identical field patterns which only overlap along the center line of the runway, means coupled to said respective radiating means for energizing each of said radiating means in successive order with a single pulse of energy in response to the reception of a single pulse of energy from said first means, second means located on said aircraft for receiving the pulses from said radiating means, a third means coupled to said second means for giving an indication of the relative amplitudes of the pulses received from said radiating means whereby a measure of the relative position of said aircraft from said runway may be obtained.

2. In a radio landing system for use in determining the relative position of an aircraft with respect to a given approach path, the combination of a first transmitter located on said aircraft for transmitting radio frequency impulses, a fixed directional antenna system positioned adjacent to the runway and having a pair of substantially identical field patterns which overlap only along the center line of the approach path, means coupled to said directional antenna system responsive to the reception of a single pulse from the first transmitter to cause said antenna system to emit in rapid sequence a single pulse of energy in each of said field patterns, the leading edge of said single pulse of energy emitted in one field pattern being coincident with the trailing edge of said single pulse of energy emitted in the other field pattern, second means located on said aircraft for receiving the pulses from said radiating means, a third means coupled to said second means for giving an indication of the relative amplitudes of the pulses received by said radiating means whereby a measure of the relative position of said aircraft from said runway center line may be obtained.

3. Beacon apparatus comprising the combination of a directional antenna system having a pair of overlapping field patterns, a single omnidirectional receiving means operative to receive a remotely transmitted energy pulse, transmitting means coupled to said directional antenna system and responsive to a pulse received by said omnidirectional receiving means to cause said transmitting means to emit in rapid sequence a single pulse of energy in each of said field patterns.

4. Beacon apparatus comprising the combination of a directional antenna system having a pair of overlapping field patterns, single omnidirectional receiving means operative to receive a remotely transmitted energy pulse, transmitting means coupled to said antenna system and responsive to a pulse from said omnidirectional receiving means to cause said transmitting means to emit in rapid sequence a single pulse of energy in each of said field patterns, the leading edge of said single pulse of energy emitted in one field pattern being coincident with the trailing edge of said single pulse of energy emitted in the other field pattern.

5. Beacon apparatus comprising the combination of a pair of directional antennas having overlapping field patterns, a first transmitting means coupled to one of said antennas and emitting a single pulse of energy responsive to the reception of a single remotely transmitted energy pulse, a second transmitting means coupled to the other of said antennas and emitting a single pulse of energy whose leading edge is in synchronism with the trailing edge of the pulse emitted by said first transmitting means, and means synchronizing said first and second transmitting means.

ROBERT A. EMMETT, Jr.

References Cited in the file of this patent

UNITED STATES PATENTS

| Number | Name | Date |
| --- | --- | --- |
| 2,002,181 | Ilberg | May 21, 1935 |
| 2,134,716 | Gunn | Nov. 1, 1938 |
| 2,288,196 | Kramar | June 30, 1942 |
| 2,405,238 | Seeley | Aug. 6, 1946 |
| 2,408,048 | Deloraine | Sept. 24, 1946 |
| 2,424,984 | Hoffman | Aug. 5, 1947 |
| 2,426,218 | Hopgood, Jr. | Aug. 26, 1947 |
| 2,426,992 | Folland | Sept. 9, 1947 |
| 2,427,029 | Stearns | Sept. 9, 1947 |
| 2,430,292 | Hershberger | Nov. 4, 1947 |
| 2,430,307 | Smith | Nov. 4, 1947 |
| 2,441,956 | Deloraine et al. | May 25, 1948 |
| 2,508,384 | Gross | May 23, 1950 |